(12) United States Patent
Yoon et al.

(10) Patent No.: US 11,237,602 B2
(45) Date of Patent: Feb. 1, 2022

(54) ELECTRONIC DEVICE HAVING SPEAKER

(71) Applicant: Samsung Electronics Co., Ltd., Suwon-si (KR)

(72) Inventors: Changshik Yoon, Suwon-si (KR); Myungcheol Lee, Suwon-si (KR); Minsu Rhee, Suwon-si (KR); Joonrae Cho, Suwon-si (KR); Choonghyo Park, Suwon-si (KR); Woojong Jeong, Suwon-si (KR); Kiwon Kim, Suwon-si (KR); Taeeon Kim, Suwon-si (KR); Youngbae Park, Suwon-si (KR); Woojin Cho, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/939,688

(22) Filed: Jul. 27, 2020

(65) Prior Publication Data

US 2021/0034119 A1 Feb. 4, 2021

(30) Foreign Application Priority Data

Jul. 31, 2019 (KR) .................. 10-2019-0093554

(51) Int. Cl.
*G06F 1/16* (2006.01)
*H04R 1/02* (2006.01)
*H04R 15/00* (2006.01)

(52) U.S. Cl.
CPC ........... *G06F 1/1688* (2013.01); *H04R 1/021* (2013.01); *H04R 1/025* (2013.01); *H04R 15/00* (2013.01)

(58) Field of Classification Search
CPC ....... G06F 1/1688; H04R 1/021; H04R 1/025; H04R 15/00

(Continued)

(56) References Cited

U.S. PATENT DOCUMENTS 9,479,873 B2 10/2016 Yamagami et al.
2006/0182304 A1 8/2006 Takase et al.
(Continued)

FOREIGN PATENT DOCUMENTS

JP 4305227 B2 7/2009
KR 10-1439916 B1 9/2014
(Continued)

OTHER PUBLICATIONS

International Search Report dated Oct. 20, 2020, issued in an International Application No. PCT/KR2020/008467.

*Primary Examiner* — Sean H Nguyen
(74) *Attorney, Agent, or Firm* — Jefferson IP Law, LLP

(57) ABSTRACT

An electronic device is provided. The electronic device includes a housing including a first plate disposed to face a first direction, a second plate disposed to face a second direction opposite to the first direction, and a side member enclosing at least part of a space between the first and second plates and having at least one speaker hole constructed thereon, and a speaker device disposed between the first and second plates to emit a sound through the speaker hole. The speaker device may include: a speaker unit including a yoke disposed to a first face facing the first direction and a diaphragm disposed to a second face facing the second direction, wherein the diaphragm is disposed to face the second direction, and is disposed to face at least part of the second plate, an enclosure shaped to enclose at least part of the speaker unit and disposed between the first and second plates, an acoustic duct constructed between the enclosure and the second plate and extending towards the at least one speaker hole, and a ferromagnetic material disposed between the first plate and the yoke.

22 Claims, 15 Drawing Sheets

(58) Field of Classification Search
USPC .......................................................... 381/150
See application file for complete search history.

(56) References Cited

U.S. PATENT DOCUMENTS

| | | |
|---|---|---|
| 2013/0094685 A1 | 4/2013 | Seo et al. |
| 2014/0023224 A1 | 1/2014 | Tao |
| 2017/0303033 A1 | 10/2017 | Shao et al. |
| 2018/0035188 A1 | 2/2018 | Lim et al. |
| 2018/0152774 A1* | 5/2018 | Dong ..................... H04R 1/025 |
| 2018/0152790 A1* | 5/2018 | Dong ..................... H04R 1/028 |
| 2019/0011959 A1* | 1/2019 | Yazaki ................. G06F 1/1688 |
| 2019/0098121 A1* | 3/2019 | Jeon ........................ H04B 1/38 |

FOREIGN PATENT DOCUMENTS

| | | |
|---|---|---|
| KR | 10-2015-0082043 A | 7/2015 |
| KR | 10-2016-0067344 A | 6/2016 |
| KR | 10-2018-0013403 A | 2/2018 |

* cited by examiner

ELECTRONIC DEVICE HAVING SPEAKER

CROSS-REFERENCE TO RELATED APPLICATION(S)

This application is based on and claims priority under 35 U.S.C. § 119(a) of a Korean patent application number 10-2019-0093554, filed on Jul. 31, 2019, in the Korean Intellectual Property Office, the disclosure of which is incorporated by reference herein in its entirety.

BACKGROUND

1. Field

The disclosure relates to a mounting structure of a speaker device of an electronic device.

2. Description of Related Art

At least one speaker device may be mounted inside a housing of an electronic device. The speaker device disposed inside the housing may be disposed in such a manner that a speaker module is enclosed by an enclosure. Since the speaker module is configured to include a magnet, it may affect materials related to magnetism disposed around the speaker device. Therefore, it may be necessary to dispose a material capable of shielding magnetism to a front or rear face of the speaker module to block leakage of magnetic flux.

When a magnetic material is applied to the front face of the speaker module for shielding, strength of a magnetic field is decreased, and thus an acoustic performance of the speaker is degraded. In order to improve the acoustic performance, it may be necessary to increase a thickness or size of the speaker module. An element constituting the thickness of the speaker module may include a single speaker, a height of an acoustic duct, a subsidiary material for preventing leakage, or a material for constructing a duct.

The above information is presented as background information only to assist with an understanding of the disclosure. No determination has been made, and no assertion is made, as to whether any of the above might be applicable as prior art with regard to the disclosure.

SUMMARY

However, the thickness of the electronic device tends to be thinner gradually, and when the speaker device is mounted in a limited mounting space, an acoustic performance may be restricted.

The speaker module generates an air flow when a diaphragm moves up and down, and may be coupled to a resonance space inside the speaker device through a ventilation hole of the speaker module. In this case, if the ventilation hole exits in a rear face of the speaker module, it is necessary to use subsidiary materials such as poron or the like to secure ventilation, and a thickness of the speaker device may be further increased.

In addition, even if the ventilation hole exists in a side face of the speaker module, when subsidiary materials are used on the rear face of the speaker device, a thickness thereof may be increased Aspects of the disclosure are to address at least the above-mentioned problems and/or disadvantages and to provide at least the advantages described below. Accordingly, an aspect of the disclosure is to provide an electronic device including a speaker mounting structure in which a ferromagnetic material is attached to a speaker module so that a magnetic field concentration of a speaker device is increased to improve an acoustic performance, in a mounting condition having a limited mounting space.

Another aspect of the disclosure is to provide an electronic device including a speaker mounting structure in which a ferromagnetic material is utilized to allow neighboring components to be less affected by a leakage magnetic force produced from a speaker module, so that neighboring electronic components are affected to the minimum extent by the leakage magnetic force of the speaker module.

Another aspect of the disclosure is to provide an electronic device including a speaker mounting structure having an advantage in making the electronic device slim.

Another aspect of the disclosure is to provide an electronic device capable of improving sound quality of a speaker device by using part of an acoustic duct as a sound absorbing material.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate disposed to face a first direction, a second plate disposed to face a second direction opposite to the first direction, and a side member enclosing at least part of a space between the first and second plates and having at least one speaker hole constructed thereon, and a speaker device disposed between the first and second plates to emit a sound through the speaker hole. The speaker device may include a speaker unit including a yoke disposed to a first face facing the first direction and a diaphragm disposed to a second face facing the second direction, wherein the diaphragm is disposed to face the second direction, and is disposed to face at least part of the second plate, an enclosure shaped to enclose at least part of the speaker unit and disposed between the first and second plates, an acoustic duct constructed between the enclosure and the second plate and extending towards the at least one speaker hole, and a ferromagnetic material disposed between the first plate and the yoke.

In accordance with another aspect of the disclosure, an electronic device is provided. The electronic device includes a housing including a first plate disposed to face a first direction, a second plate disposed to face a second direction opposite to the first direction, and a side member enclosing at least part of a space between the first and second plates and having at least one speaker hole constructed thereon, a display disposed such that displayed information is visible through at least some regions of the first plate, and a speaker device disposed between the display and the second plate to emit a sound through the at least one speaker hole. The speaker device may include a speaker unit including a yoke disposed to a first face facing the first direction and a diaphragm disposed to a second face facing the second direction, wherein the diaphragm is disposed to face the second direction, and is disposed to face at least part of the second plate, an enclosure shaped to enclose at least part of the speaker unit and disposed between the display and the second plate, an acoustic duct constructed between the enclosure and the second plate and extending towards the at least one speaker hole, and a ferromagnetic material disposed between the display and the yoke.

An electronic device according to various embodiments of the disclosure can reduce surrounding influence caused by a magnetic force by using a ferromagnetic material to block a leakage magnetic force.

An electronic device according to various embodiments can improve a sound volume by installing a ferromagnetic material to improve a magnetic field concentration of a speaker device.

All devices according to various embodiments of the disclosure can increase a resonance space and secure a front gap due to a decrease in a speaker mounting thickness, and can facilitate to make an electronic device slim in thickness.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
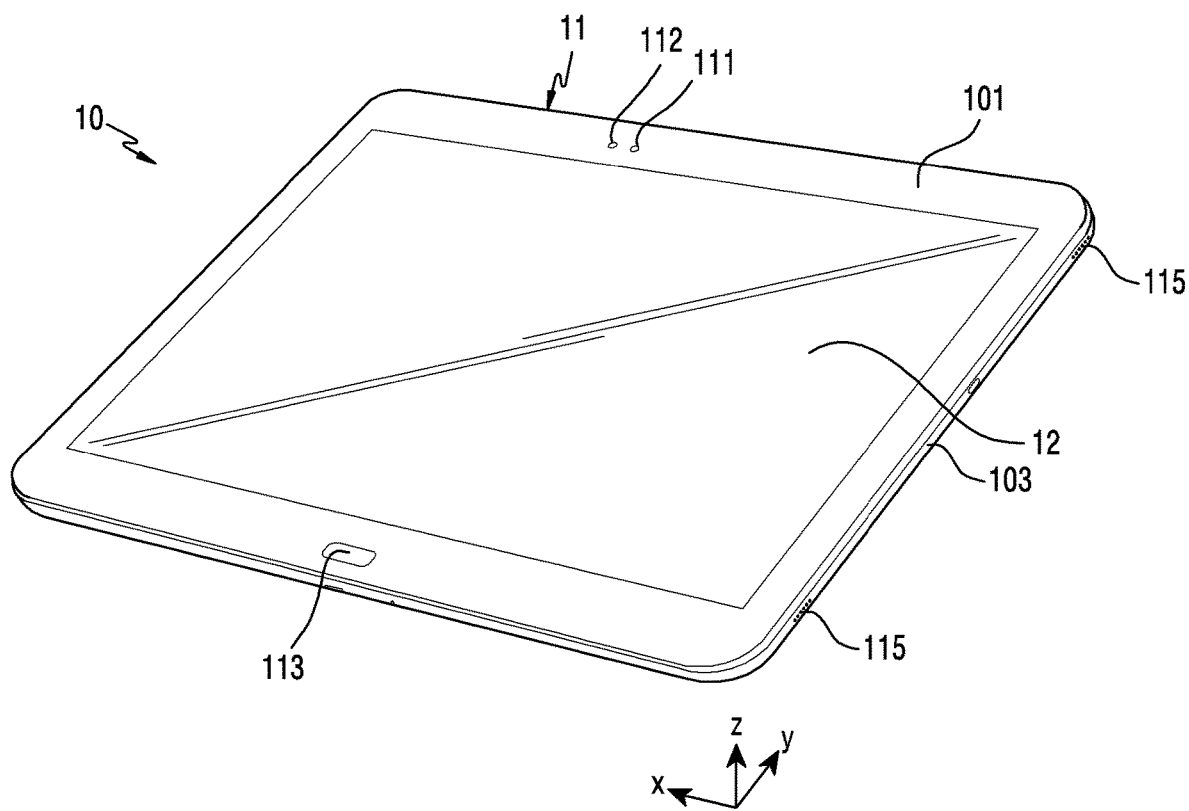
FIG. 1 is a perspective view illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a Moving Picture Experts Group (MPEG-1) Audio Layer 3 (MP3) player, a mobile medical device, a camera, and a wearable device (e.g., smart glasses, a Head-Mounted Display (HMD), electronic clothes, an electronic bracelet, an electronic necklace, an electronic appcessory, an electronic tattoo, a smart mirror, or a smart watch).

According to some embodiments, the electronic device may be a smart home appliance. The smart home appliance may include, for example, at least one of a Television (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a heartrate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or a part of buildings/constructions, an electronic board, an electronic signature input device, a projector, and various measurement machines (e.g., water supply, electricity, gas, propagation measurement machine, etc.). In various embodiments, the electronic device may be one or more combinations of the aforementioned various devices. According to some embodiments, the electronic device may be a flexible device. Further, the electronic device according to an embodiment of the disclosure is not limited to the aforementioned devices, and may include a new electronic device depending on technical progress.

FIG. 1 is a perspective view illustrating an electronic device according to an embodiment of the disclosure.

Figure 2:
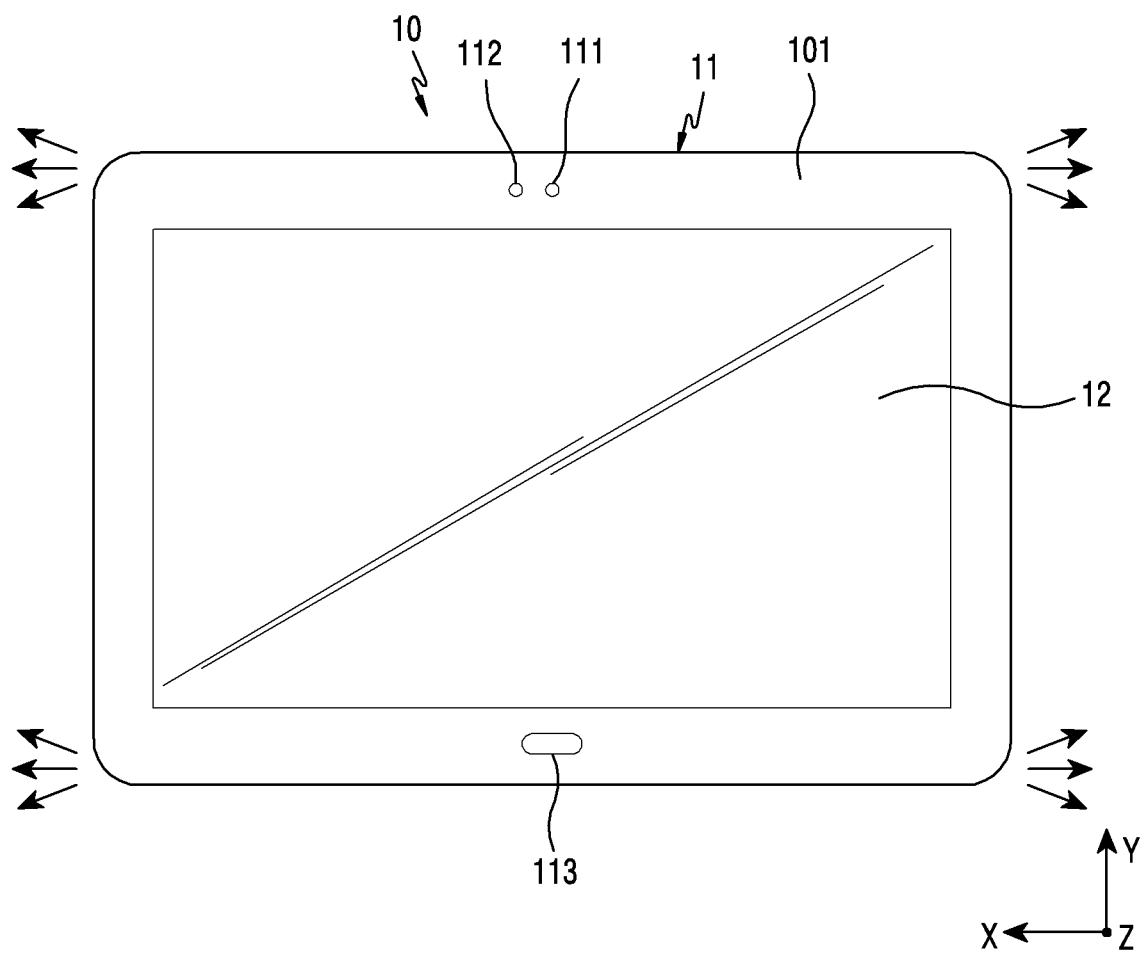
FIG. 2 is a plan view illustrating an electronic device according to an embodiment of the disclosure.

FIG. 2 is a plan view illustrating an electronic device according to various an embodiment of the disclosure.

Figure 3:
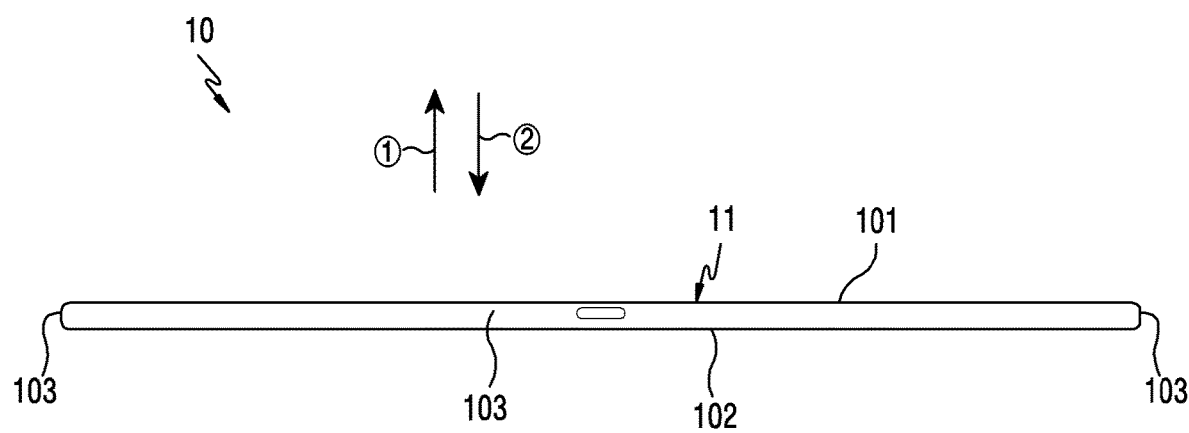
FIG. 3 is a front view illustrating an electronic device according to an embodiment of the disclosure.

FIG. 3 is a front view illustrating an electronic device according to various an embodiment of the disclosure.

Figure 4:
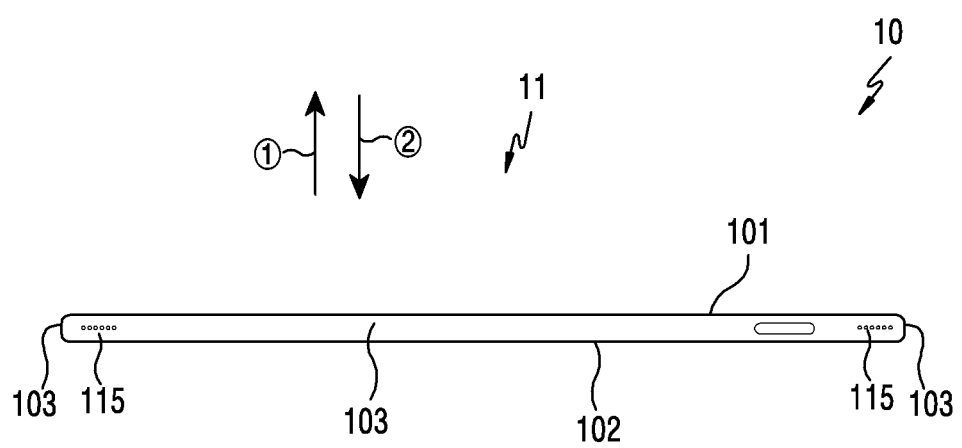
FIG. 4 is a side view illustrating an electronic device according to an embodiment of the disclosure.

FIG. 4 is a side view illustrating an electronic device according to an embodiment of the disclosure.

Referring to FIGS. 1 to 4, an electronic device 10 according to an embodiment may include a housing 11 which protects a variety of components and provides an exterior. For example, the housing 11 may be constructed of a metal material or a synthetic resin material. According to an embodiment, the housing 11 may include a first plate 101, a second plate 102, and a side member 103.

According to an embodiment, the housing 11 may include the first plate 101 disposed to face a first direction ①, the second plate 102 disposed to face a second direction ② opposite to the first direction ①, and the side member 103 disposed to perpendicularly face the first and second directions ① and ②. According to an embodiment, the side member 103 may enclose at least part of a space between the first and second plates 101 and 102, and may have at least one speaker hole 115.

According to an embodiment, in the electronic device 10, a display 12, an optical sensor 112, a camera 111, and a home button 113 may be disposed to the first plate 101. According to an embodiment, the display 12 may be disposed such that displayed information is visible through at least part of the first plate 101. According to an embodiment, the camera 111, the optical sensor 112, and the home button 113 may be disposed in a non-display region of the first plate 101.

According to an embodiment, the display 12 may be exposed, for example, through a top portion of the first plate. According to an embodiment, the display 12 may be disposed adjacent to or joined with a touch sensing circuit, a pressure sensor capable of measuring touch strength (pressure), and/or a digitizer for detecting a magnetic-type stylus pen.

According to an embodiment, the at least one speaker hole 115 may be constructed in the side member 103. For example, the speaker holes 115 may be constructed at four places to provide a stereo sound. For example, in a front view of the first plate 101, the speaker hole 115 may be constructed in the side member 103 located at both sides of the top, and may be constructed in the side member 103 located at both sides of the bottom. In FIG. 2, an arrow mark indicates a direction of a sound emitted from the speaker device 20.

Figure 5:
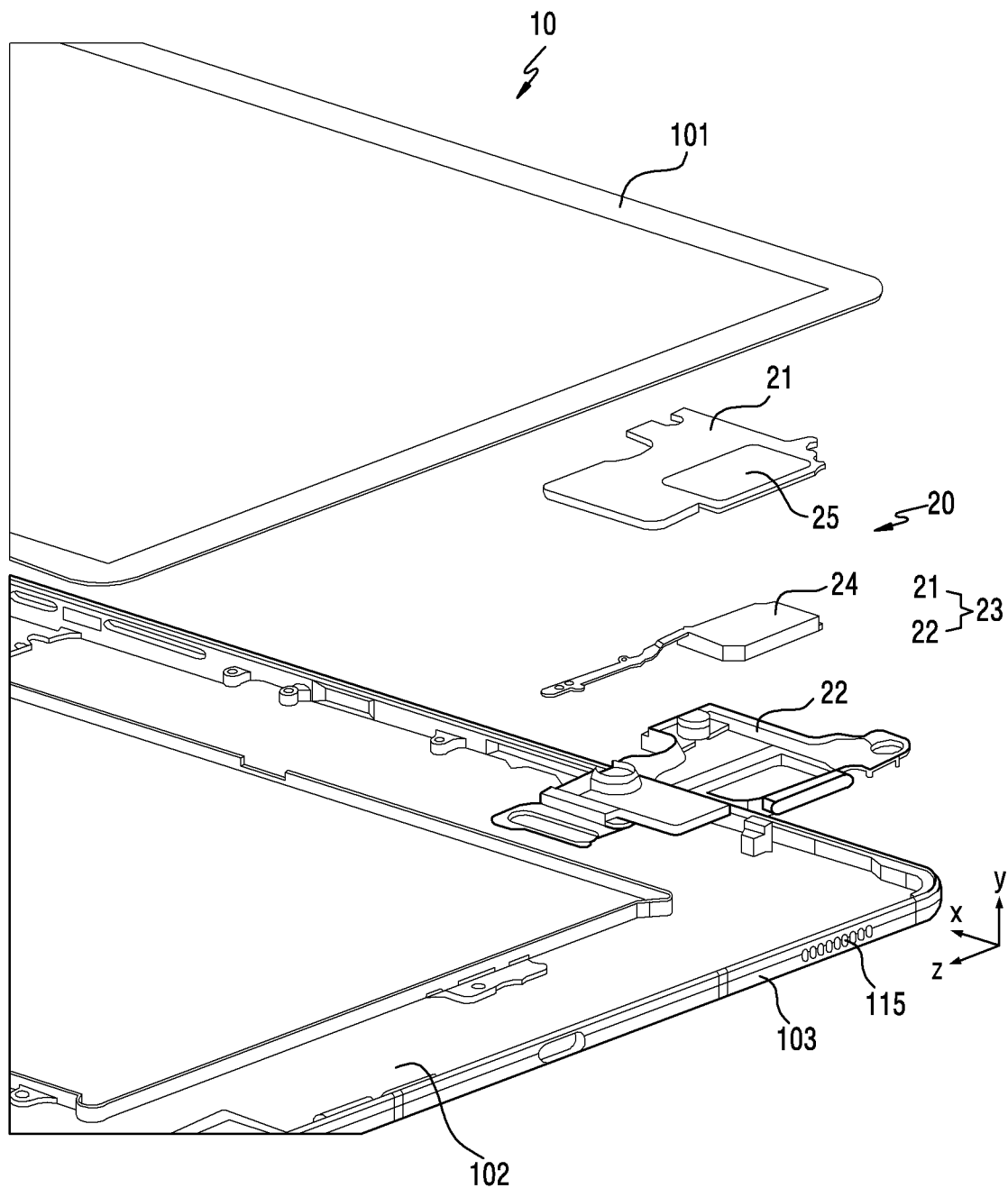
FIG. 5 is an exploded perspective view of a speaker device mounted to an electronic device according to an embodiment of the disclosure.

FIG. 5 is an exploded perspective view of a speaker device mounted to an electronic device according to an embodiment of the disclosure.

Referring to FIG. 5, a speaker device 20 according to an embodiment may include at least one speaker module 24, an enclosure 23, and a ferromagnetic material 25. At least one speaker device 20 may be disposed in a mounting space between the first and second plates 101 and 102. According to an embodiment, in the mounting space between the first and second plates 101 and 102, the speaker device 20 may be disposed in a corner region. The enclosure 23 may include a first enclosure 21 and a second enclosure 22.

According to an embodiment, the speaker device 20 may be mounted to the second plate 102 in a state where the speaker unit 24 is enclosed by the enclosure 23.

Figure 6A:
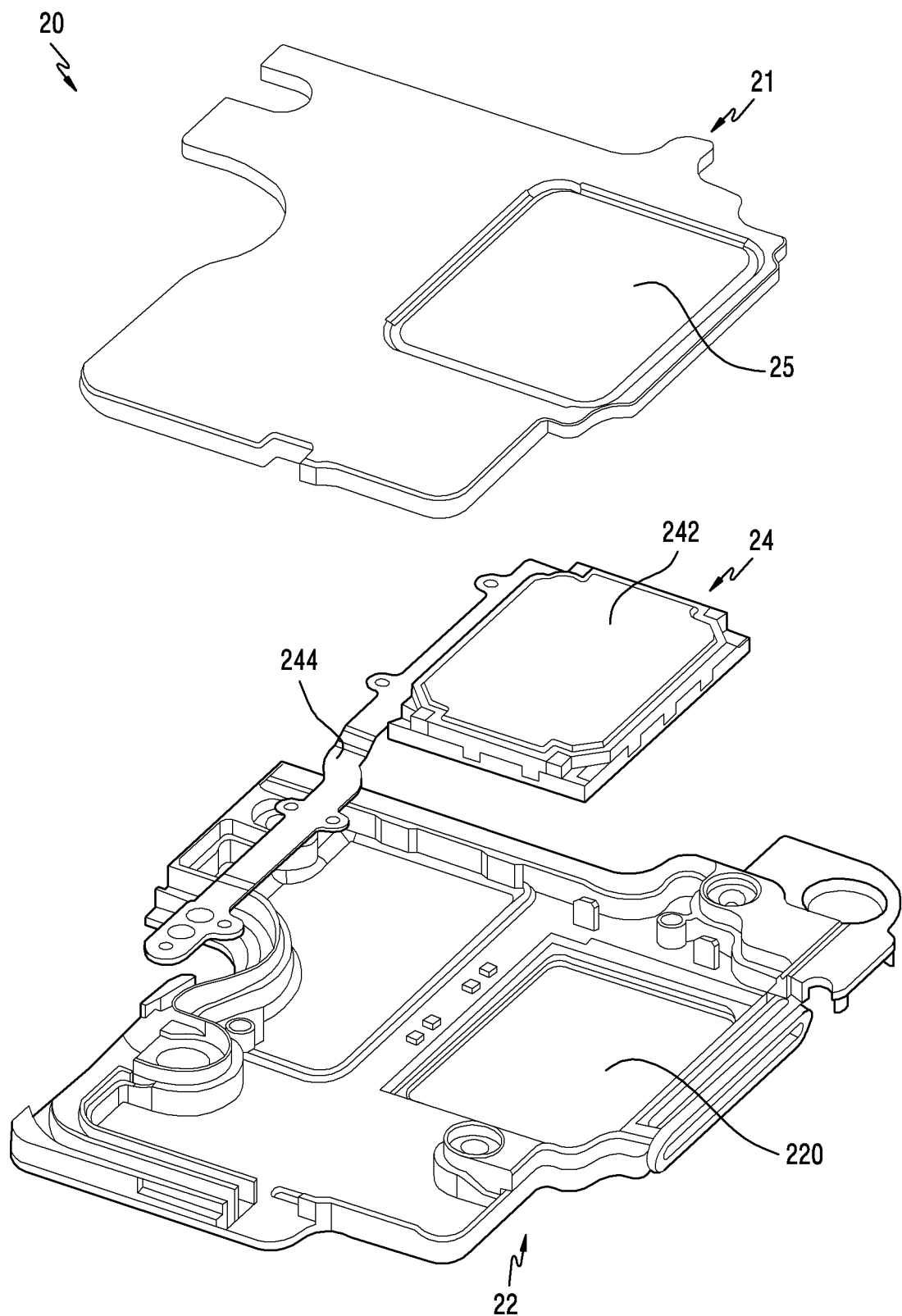
FIG. 6A is an exploded perspective view illustrating a structure of an speaker device in which a ferromagnetic material is assembled according to an embodiment of the disclosure.
Figure 6B:
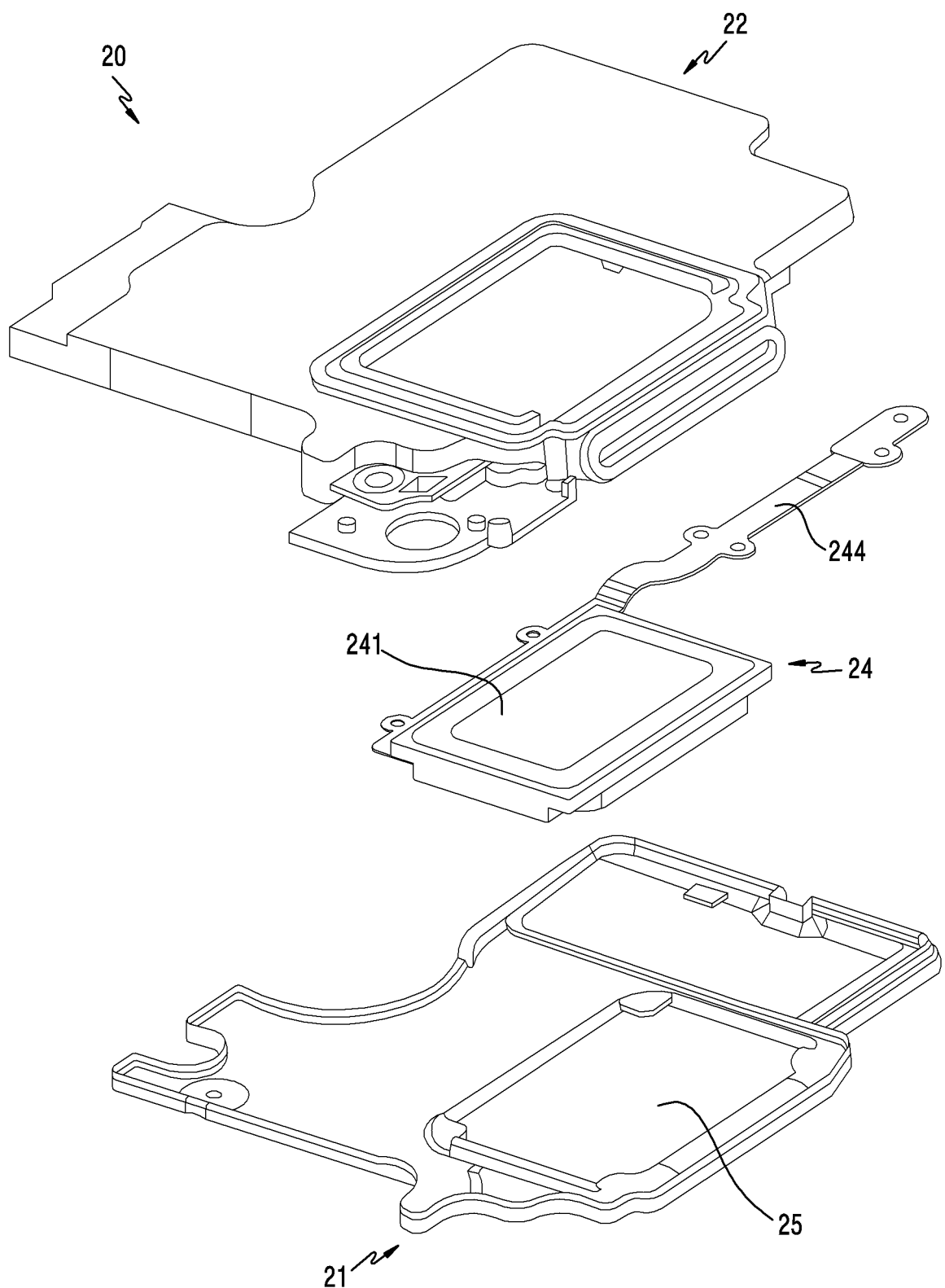
FIG. 6B is an exploded perspective view illustrating a structure of an speaker device in which a ferromagnetic material is assembled according to an embodiment of the disclosure.

FIGS. 6A and 6B are exploded perspective views illustrating a structure of a speaker device in which a ferromagnetic material is assembled according to various embodiments of the disclosure.

Figure 7A:
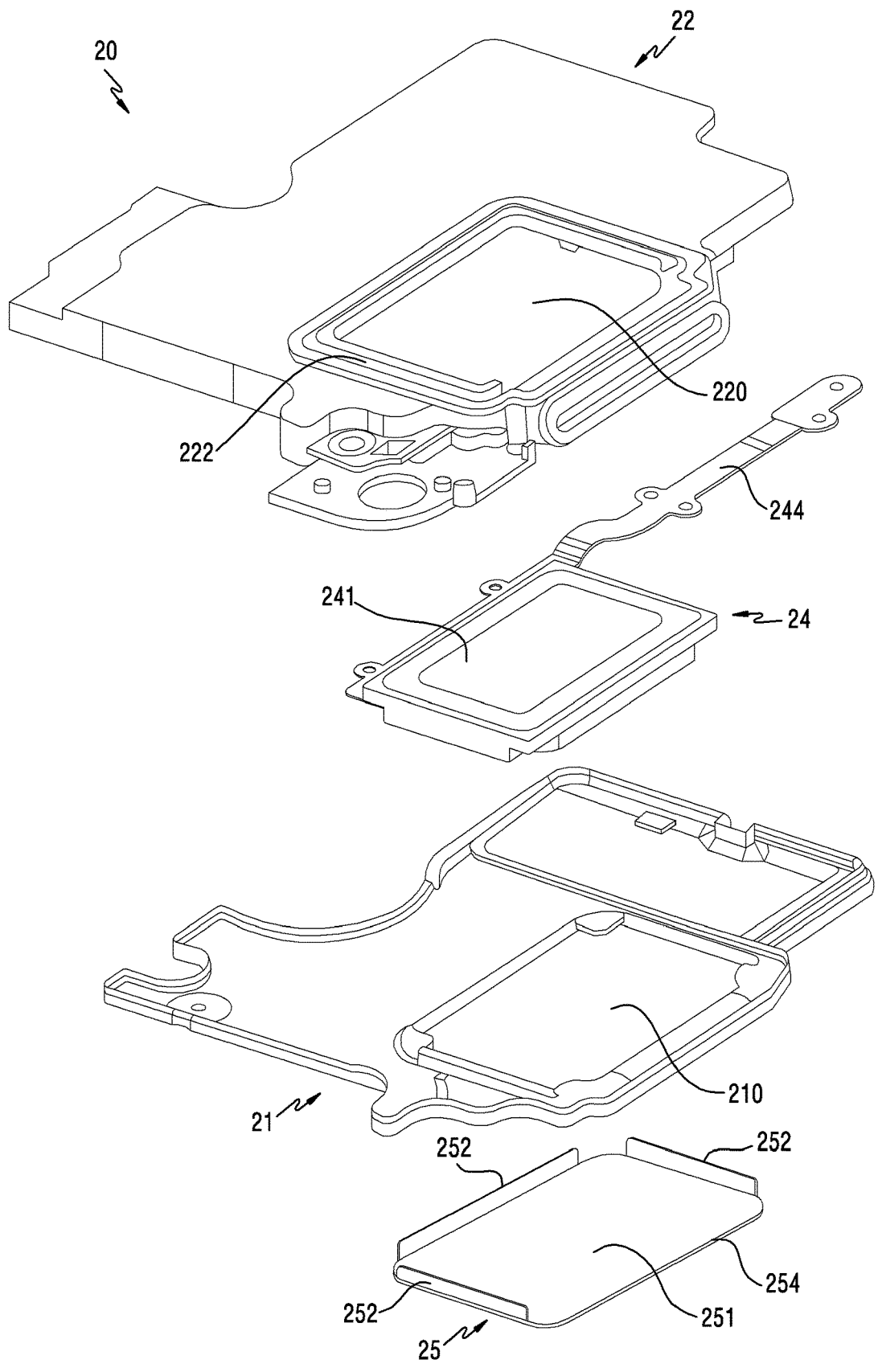
FIG. 7A is an exploded perspective view illustrating a structure of a speaker device in which a ferromagnetic material is separated according to an embodiment of the disclosure.
Figure 7B:
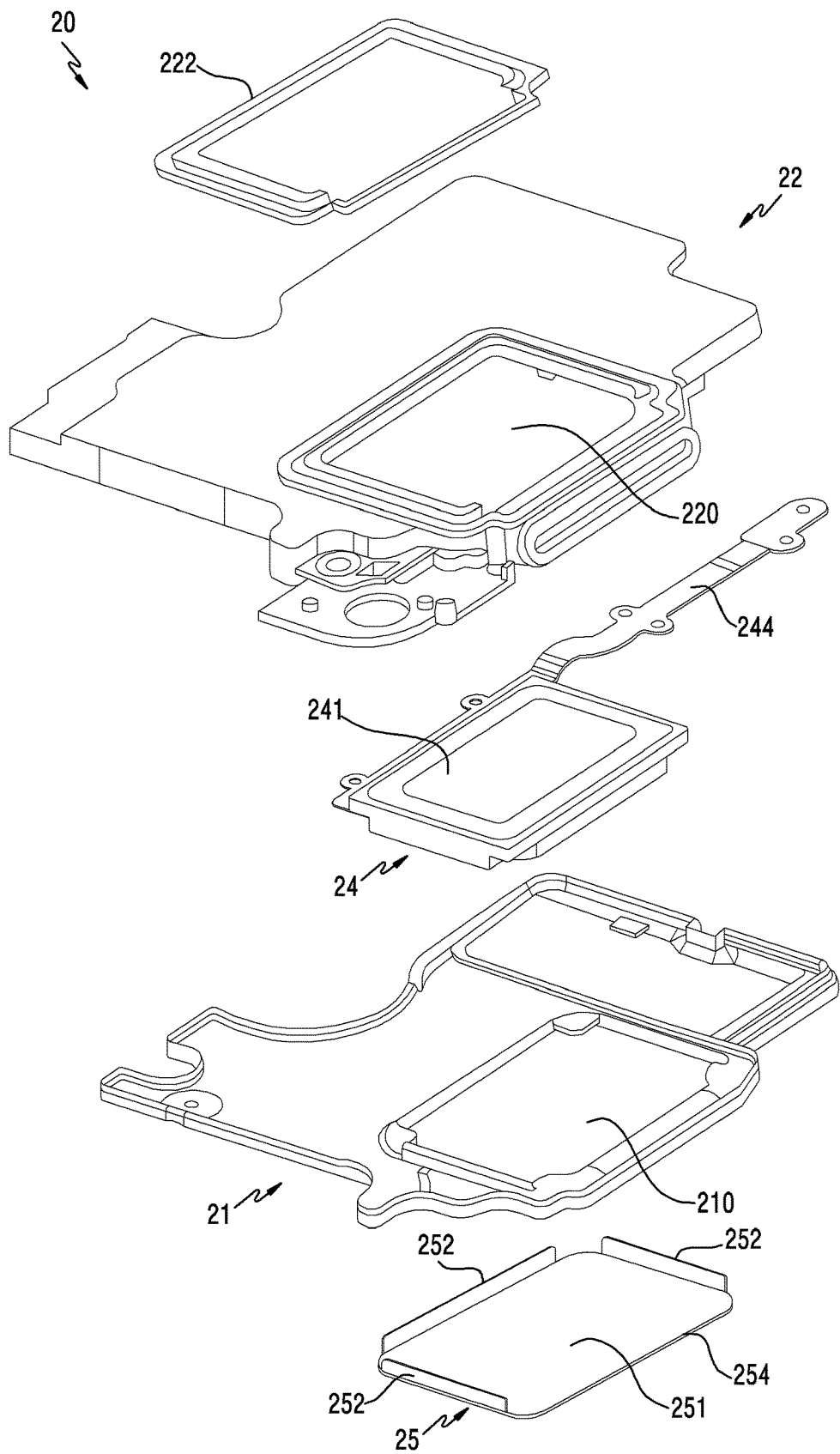
FIG. 7B is an exploded perspective view illustrating a structure of a speaker device in which a ferromagnetic material is separated according to an embodiment of the disclosure.

FIGS. 7A and 7B are exploded perspective views illustrating a structure of a speaker device in which a ferromagnetic material is separated according to various embodiments of the disclosure.

Referring to FIGS. 6A, 6B, 7A, and 7B, according to an embodiment, the at least one speaker unit 24 may be disposed inside the enclosure 23. The speaker unit 24 may have a diaphragm 241 disposed at the top and a yoke 242 disposed at the bottom. According to an embodiment, the speaker unit 24 may be mounted to the enclosure 23.

According to an embodiment, the enclosure 23 may be a support for fixing the speaker unit 24. At least one enclosure may be mounted in the housing 11, as a protection member serving as a resonator of a sound emitted from the speaker unit 24. According to an embodiment, the enclosure 23 may include the first enclosure 21 and the second enclosure 22. The first and second enclosures may be constructed as one body through an assembly process (e.g., fusion, etc.).

According to an embodiment, a first opening 210 may be constructed on the first enclosure 21, and a second opening 220 may be constructed on the second enclosure 22. The ferromagnetic material 25 may be disposed to the first opening 210, and the diaphragm 241 of the speaker unit 24 may be disposed to the second opening 220.

According to an embodiment, the ferromagnetic material 25 is a metal material, and may be mounted to minimize surrounding influence caused by a magnetic force by blocking a leakage magnetic force and to improve a sound volume by enhancing a magnetic field concentration.

According to an embodiment, the ferromagnetic material 25 may be disposed on the yoke 242 disposed at the bottom of the speaker unit 24. According to an embodiment, if the speaker unit 24 is configured to be disposed to a bottom face of the display module, the ferromagnetic material 25 may be disposed between the display module and the yoke 242 of the speaker unit 24. For example, the yoke 242 is a metal material, and may be one of materials of a synthetic resin, a ferromagnetic material, and a magnetic material, or combinations thereof.

According to an embodiment, the ferromagnetic material 25 is a metal material of a thin plate, and may use one of materials of iron (e.g., steel plate), permalloy (e.g., nickel alloy), and sendust (e.g., iron-silicon-aluminum alloy). According to an embodiment, a magnetic flow may be controlled in the ferromagnetic material 25 disposed adjacent to the yoke 242.

According to an embodiment, the ferromagnetic material 25 may include first and second portions 251 and 252. According to an embodiment, the first portion 251 may face the yoke face, in a face-to-face manner, and may be disposed in contact therewith. According to an embodiment, the second portions 252 may be bent by about 90 degrees around an outer perimeter of the first portion 251. The second portions 252 are sidewalls capable of improving a magnetic field concentration.

According to an embodiment, the ferromagnetic material 25 may have an open portion 254 between the second portions 252. The open portion 254 may be open toward at least one speaker (e.g., the speaker holes 115 of FIG. 4).

According to an embodiment, the speaker unit 24 may be electrically coupled to an amplifier (not shown) by using an electrical connection member 244. For example, the electrical connection member 244 may include a flexible printed circuit board.

Figure 8:
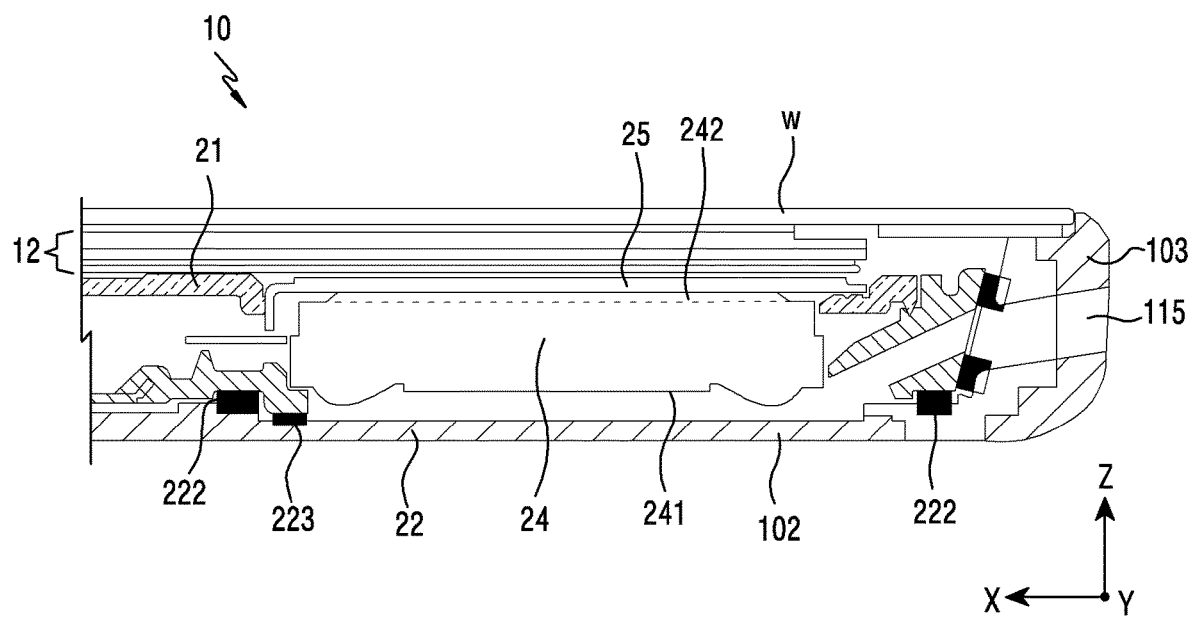
FIG. 8 is a cross-sectional view illustrating a mounting structure of a speaker device mounted to an electronic device according to an embodiment of the disclosure.

FIG. 8 is a cross-sectional view illustrating a mounting structure of a speaker device mounted to an electronic device according to an embodiment of the disclosure.

Referring to FIG. 8, according to an embodiment, a speaker device (e.g., the speaker device 20 of FIG. 5) may be disposed between the display 12 and the second plate 102. For example, the display 12 may be disposed between the first and second plates 101 and 102. According to an embodiment, the ferromagnetic material 25 may be disposed between the display 12 and the speaker unit 24, and may be disposed in a face-to-face manner to have a gap. According to an embodiment, the speaker device 20 may include an acoustic duct through which a sound emitted from the speaker unit 24 passes to move to the speaker hole 115. According to an embodiment, the acoustic duct may be an injection structure such as an acoustic guide duct for transmitting the sound emitted from the speaker unit 24 to the at least one speaker hole 115.

According to an embodiment, the acoustic duct may perform a function of switching a path of the sound emitted from the speaker unit 24 and a function of collecting the sound. For example, although the sound emitted from the speaker unit 24 is toward a second direction, the sound emitted through the acoustic duct may be toward an outer direction.

According to an embodiment, the acoustic duct may be constructed by combining part of the second enclosure 22 and part of the second plate 102 of the housing 11. For example, the acoustic duct may be a guide path of a sound emitted from the speaker unit 24.

According to an embodiment, since the acoustic duct utilizes part of the second plate 102 of the housing 11, a mounting thickness of the speaker device 20 can be reduced from a perspective of a mounting structure of the speaker device 20. According to an embodiment, the acoustic duct may be constructed by using a subsidiary material (e.g., poron, tape) while avoiding an increase in the mounting thickness. According to an embodiment, the acoustic duct can improve an acoustic performance by using an additional subsidiary material. w may indicate a transparent substrate. For example, the transparent substrate may be a window.

According to an embodiment, a sound absorbing material 223 may be further disposed between the second enclosure and the second plate. According to an embodiment, the sound absorbing material 223 may minimize a space of a front portion of the speaker unit 24 to increase a reproduction band. For example, the sound absorbing material 223 may include a sponge.

According to an embodiment, the second enclosure 22 may further include an elastic member 222. The elastic member 222 may be disposed between the second enclosure 22 and the second plate 102 to support the enclosure 23. According to an embodiment, the elastic member 222 may be disposed along a second opening (e.g., the second opening 220 of FIG. 7A) of the second enclosure 22. For example, the elastic member 222 may be constructed of rubber or silicon.

Figure 9:
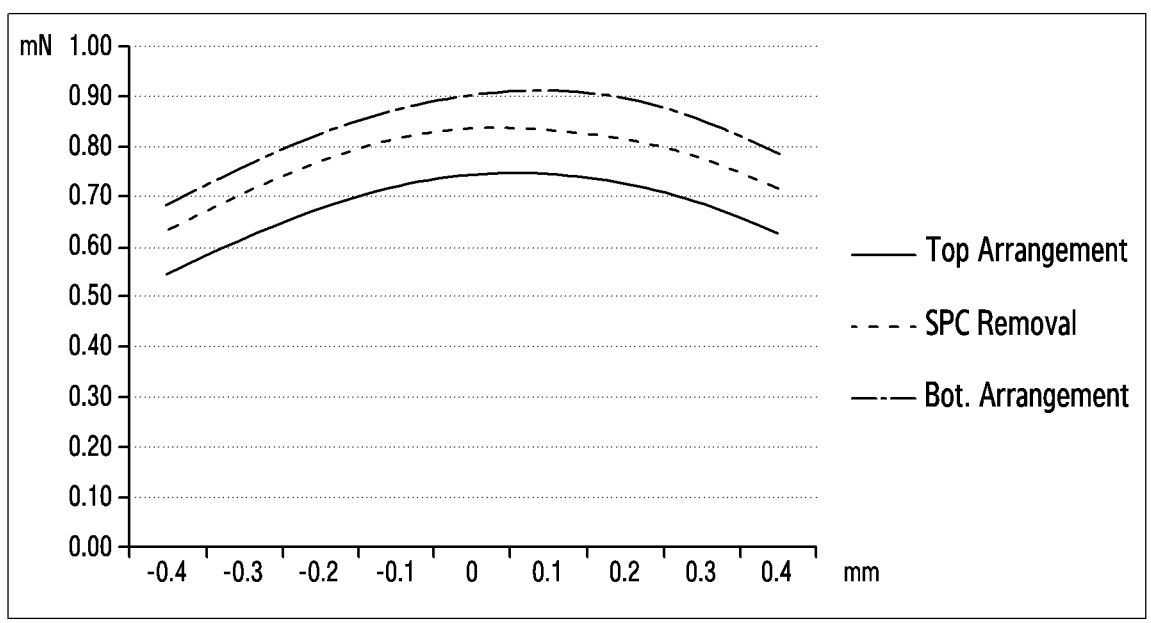
FIG. 9 is a graph illustrating a difference of a BL force depending on an arrangement location of a ferromagnetic material according to an embodiment of the disclosure.

FIG. 9 is a graph illustrating a difference of a BL force depending on an arrangement location of a ferromagnetic material according to an embodiment of the disclosure.

Referring to FIG. 9, the difference of the BL force is shown depending on an arrangement location of the ferromagnetic material 25. An embodiment in which the ferromagnetic material is disposed to the bottom (yoke face) of the speaker unit 24 is illustrated in FIG. 8.

According to an embodiment, a BL value may be improved when the ferromagnetic material 25 is disposed at the bottom (yoke face) as a result of measuring the BL value for a case where a ferromagnetic material (e.g., the ferromagnetic material 25 of FIG. 5) super paramagnetic clustering (SPC) is disposed at the top of the speaker unit 24, the SPC is disposed at the bottom (yoke face) of the speaker unit 24, and the SPC is not disposed.

Figure 10:
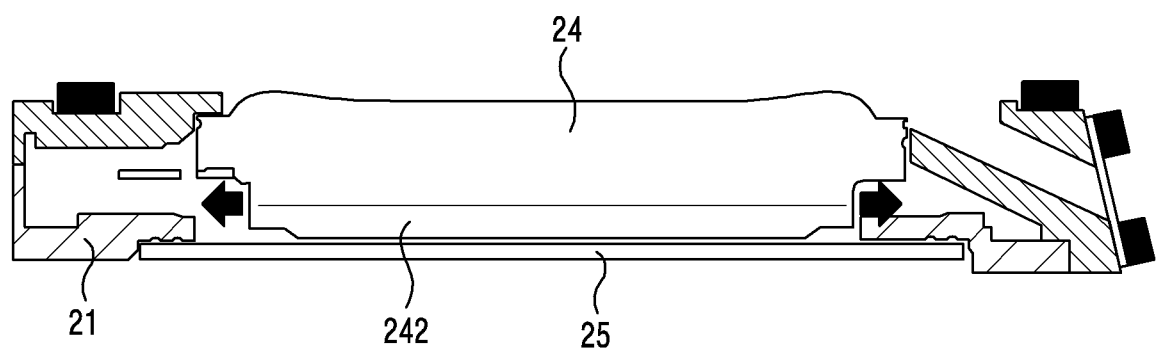
FIG. 10 is a cross-sectional view illustrating a speaker unit according to an embodiment of the disclosure.

FIG. 10 is a cross-sectional view illustrating a speaker unit according to an embodiment of the disclosure.

Referring to FIG. 10, the speaker device 20 according to an embodiment may attach the ferromagnetic material 25 from the outside. According to an embodiment, when the ferromagnetic material 25 is attached to the first enclosure 21 from the outside, an air flow of a ventilation hole of the speaker unit 24 can be improved. According to an embodiment, the ferromagnetic material 25 attachable to the first enclosure 21 from the outside may be disposed by locally being bent to improve a function of shielding a magnetic force produced from the speaker unit 24.

Figure 11:
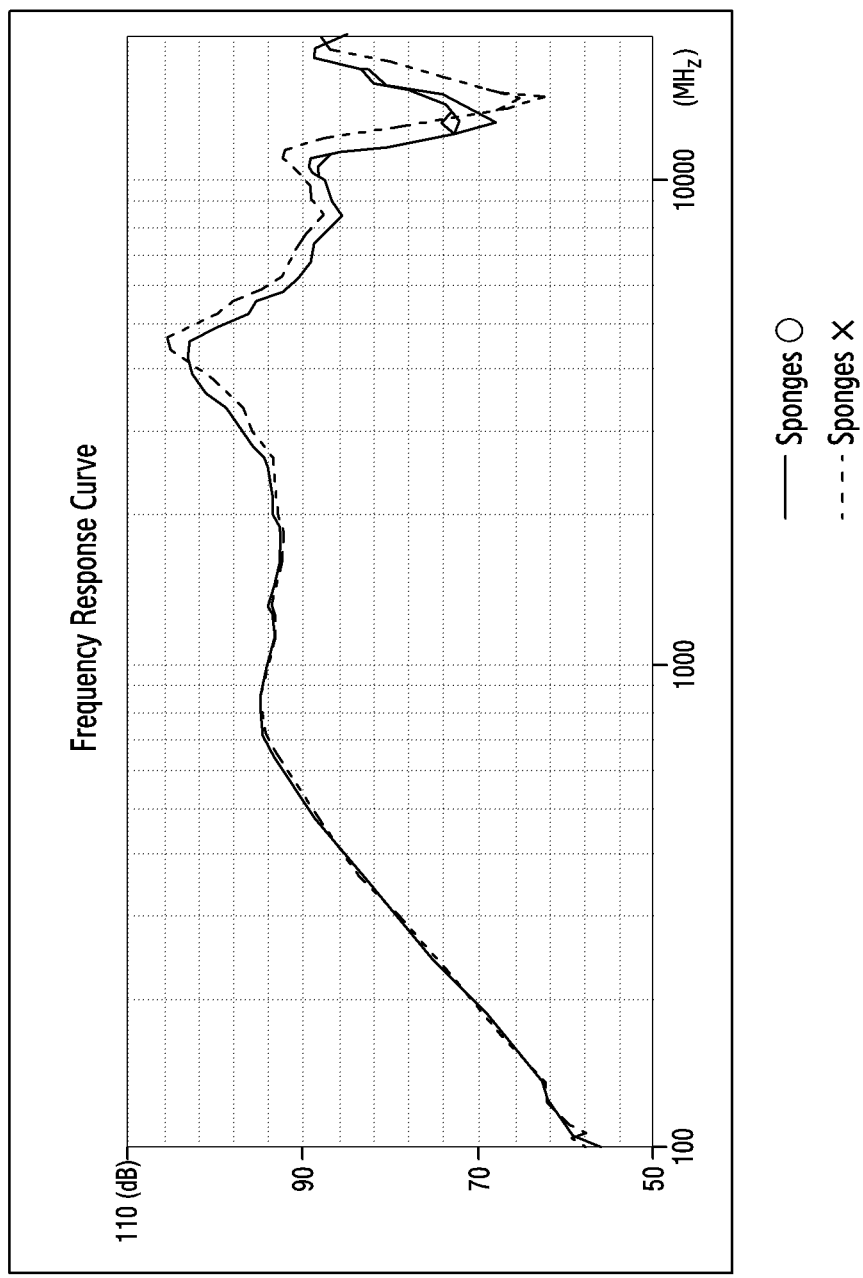
FIG. 11 is a graph illustrating a frequency response characteristic depending on the presence or absence of a sound absorbing material according to an embodiment of the disclosure.

FIG. 11 is a graph illustrating a frequency response characteristic depending on the presence or absence of a sound absorbing material according to an embodiment of the disclosure.

Referring to FIG. 11, a frequency response characteristic is illustrated depending on the presence or absence of the sound absorbing material of FIG. 8. When the sound absorbing material (e.g., the sound absorbing material 223 of FIG. 8) is present in a gap between the second plate 102 and an end portion of the second enclosure 22, a space of a front portion of the speaker unit 24 may be minimized to increase a reproduction band, compared to a case where the sounding absorbing material is absent. For example, the sound absorbing material may include a sponge.

Figure 12:
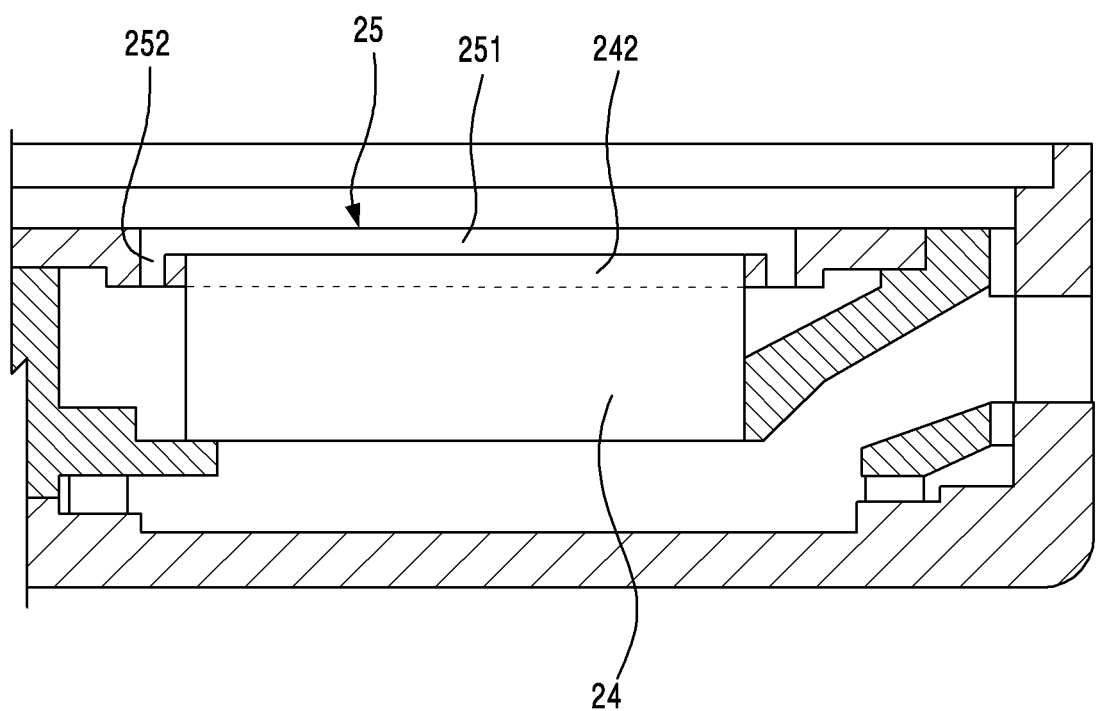
FIG. 12 is a cross-sectional view illustrating a mounting structure of a speaker device mounted to an electronic device according to an embodiment of the disclosure.

FIG. 12 is a cross-sectional view illustrating a mounting structure of a speaker device mounted to an electronic device according to an embodiment of the disclosure.

Referring to FIG. 12, according to an embodiment, the ferromagnetic material 25 may change a shape in order to improve a magnetic field concentration. According to an embodiment, the larger the area in which the ferromagnetic material 25 is closely in contact with the yoke 242 of the speaker unit 24, the greater the shielding effect of the leakage magnetic force and the better the effect of increasing the BL concentration. According to an embodiment, the ferromagnetic material 25 may include the plurality of side walls 252 (e.g., the second portion 252 of FIG. 7A and FIG.

7B) shaped to enclose the yoke 242 of the speaker unit 24 and constructed by bending a perimeter portion about 90 degrees.

According to an embodiment, the ferromagnetic material 25 is constructed of a thin plate-shaped stainless steel (SUS) material, and may include a first portion facing a yoke face and a second portion enclosing a side face of the yoke 242.

Figure 13:
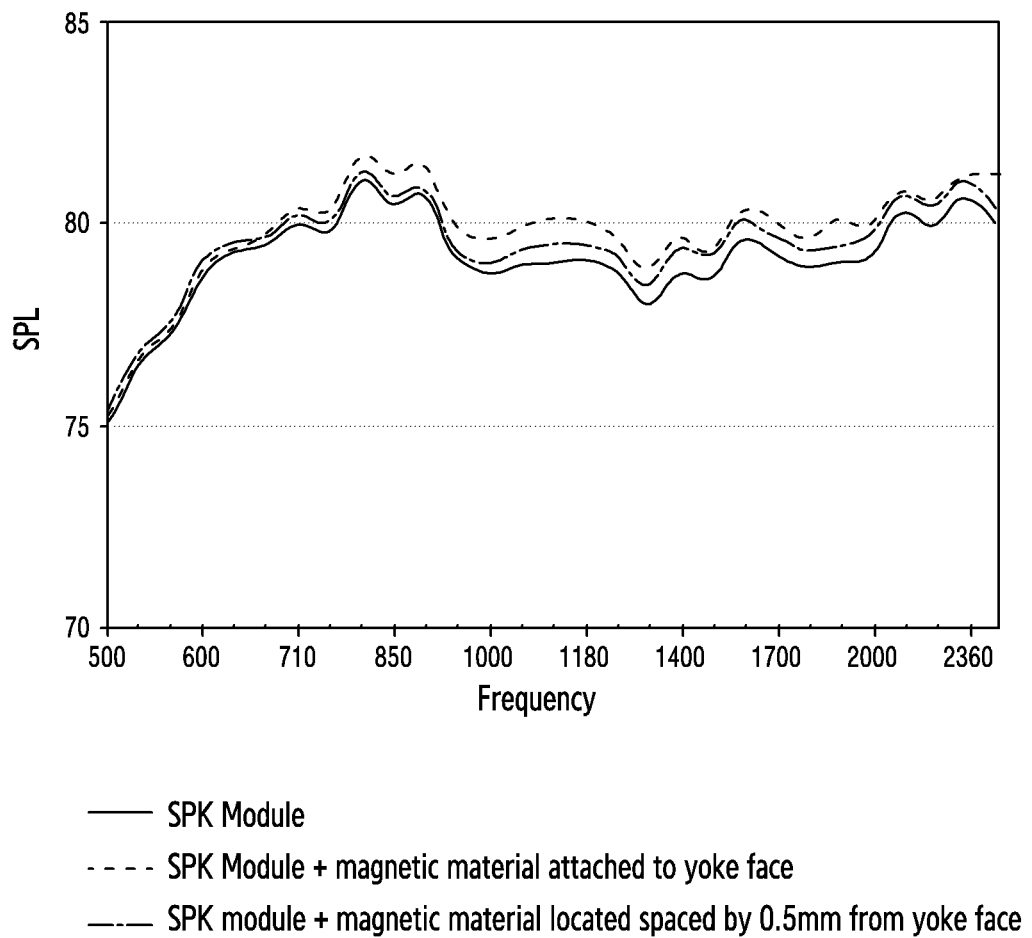
FIG. 13 is a graph illustrating an acoustic performance difference depending on a distance difference between a ferromagnetic material and a yoke face according to an embodiment of the disclosure.

FIG. 13 is a graph illustrating an acoustic performance difference depending on a distance difference between a ferromagnetic material and a yoke face according to an embodiment of the disclosure.

Referring to FIG. 13, a speaker device (e.g., the speaker device 20 of FIG. 5) according to an embodiment may have an improved acoustic performance when the ferromagnetic material 25 approaches the yoke face. For example, the acoustic performance of the speaker device 20 may be good when the ferromagnetic material 25 is disposed spaced apart by about 0.5 mm from the yoke face, compared to a case where the ferromagnetic material 25 is absent in the yoke face. In addition, when the ferromagnetic material 25 is attached to the yoke face, the acoustic performance of the speaker device 20 may be good, compared to a case where the ferromagnetic material 25 is disposed spaced apart by about 0.5 mm from the yoke face.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
  a housing comprising:
    a first plate facing a first direction,
    a second plate facing a second direction opposite to the first direction, and
    a side member enclosing at least part of a space between the first and second plates and having at least one speaker hole constructed thereon; and
  a speaker device disposed between the first and second plates and configured to emit a sound through the at least one speaker hole,
  wherein the speaker device comprises:
    a speaker comprising a yoke and a diaphragm, the yoke being disposed on a first face of the speaker that faces the first direction, the diaphragm being disposed on a second face of the speaker that faces the second direction, the diaphragm facing at least part of the second plate,
    an enclosure enclosing at least part of the speaker and being disposed between the first and second plates,
    an acoustic duct constructed between the enclosure and the second plate and extending towards the at least one speaker hole, and
    a ferromagnetic material disposed on the yoke and between the first plate and the yoke.

2. The electronic device of claim 1, wherein the ferromagnetic material is disposed face-to-face in contact with a face of the yoke.

3. The electronic device of claim 1, wherein the ferromagnetic material operates as a magnetic shielding layer of the speaker device.

4. The electronic device of claim 3, wherein the ferromagnetic material is constructed of a thin plate.

5. The electronic device of claim 1, wherein the ferromagnetic material is disposed to face the first plate in a face-to-face manner to have a gap.

6. The electronic device of claim 1, wherein the ferromagnetic material comprises:
  a first portion in contact with a face of the yoke; and
  a second portion bent from an outer perimeter of the first portion and enclosing the face of the yoke.

7. The electronic device of claim 6, wherein the ferromagnetic material comprises an open portion which exists between surfaces of the second portion.

8. The electronic device of claim 7, wherein the open portion is open towards the at least one speaker hole.

9. The electronic device of claim 1, wherein the ferromagnetic material comprises any one of iron, permalloy, and sendust.

10. The electronic device of claim 1,
  wherein the enclosure comprises:
    a first enclosure having a first opening; and
    a second enclosure having a second opening and fused to the first enclosure, and
  wherein the ferromagnetic material is disposed in the first opening and the diaphragm is disposed in the second opening.

11. The electronic device of claim 10, wherein the acoustic duct is constructed between part of the second enclosure and part of the second plate.

12. The electronic device of claim 10, wherein a sound absorbing material is further disposed between an end portion of the second enclosure and the second plate.

13. The electronic device of claim 1,
  wherein the acoustic duct is sealed from an inner space of the electronic device by of an elastic member, and
  wherein the acoustic duct is spatially coupled to the at least one speaker hole.

14. The electronic device of claim 13,
  wherein the elastic member is disposed between a second enclosure and the second plate, and
  wherein the elastic member is disposed along a perimeter of a second opening of the second enclosure.

15. An electronic device comprising:
  a housing comprising:
    a first plate facing a first direction,
    a second plate facing a second direction opposite to the first direction, and
    a side member enclosing at least part of a space between the first and second plates and having at least one speaker hole constructed thereon;
  a display disposed such that displayed information is visible through at least some regions of the first plate; and
  a speaker device disposed between the display and the second plate and configured to emit a sound through the at least one speaker hole,
  wherein the speaker device comprises:
    a speaker comprising a yoke and a diaphragm, the yoke being disposed on a first face of the speaker that faces the first direction, the diaphragm being disposed on a second face of the speaker that faces the second direction, the diaphragm facing at least part of the second plate,
    an enclosure enclosing at least part of the speaker and being disposed between the display and the second plate,
    an acoustic duct constructed between the enclosure and the second plate and extending towards the at least one speaker hole, and
    a ferromagnetic material disposed on the yoke and between the display and the yoke.

16. The electronic device of claim 15, wherein the ferromagnetic material comprises:
   a first portion in contact with one face of the yoke; and
   a second portion bent from an outer perimeter of the first portion and enclosing a side face of the yoke.

17. The electronic device of claim 16, further comprising an open portion existing between surfaces of the second portion.

18. The electronic device of claim 17, wherein the second portion comprises a sidewall and is configured to improve a magnetic field concentration.

19. The electronic device of claim 15,
   wherein the enclosure comprises:
      a first enclosure having a first opening; and
      a second enclosure having a second opening and fused to the first enclosure, and
   wherein the ferromagnetic material is disposed in the first opening and the diaphragm is disposed in the second opening.

20. The electronic device of claim 19,
   wherein the acoustic duct is constructed between part of the second enclosure and part of the second plate,
   wherein the acoustic duct is sealed from an inner space of the electronic device by an elastic member, and
   wherein the acoustic duct is spatially coupled to the at least one speaker hole.

21. The electronic device of claim 20, wherein the acoustic duct is configured to switch a path of the sound emitted from the speaker.

22. The electronic device of claim 15, wherein the ferromagnetic material is disposed face-to-face in contact with the display to have a gap.

* * * * *